United States Patent
Ferdowsi et al.

(10) Patent No.: US 11,397,439 B1
(45) Date of Patent: Jul. 26, 2022

(54) SYSTEM FOR TUNING PARAMETERS OF A THERMAL SENSOR TO IMPROVE OBJECT DETECTION

(71) Applicant: Zoox, Inc., Foster City, CA (US)

(72) Inventors: Mehran Ferdowsi, San Mateo, CA (US); Holly Ho, Palo Alto, CA (US); Adam Pollack, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 2 days.

(21) Appl. No.: 17/247,468

(22) Filed: Dec. 11, 2020

(51) Int. Cl.
  *G05D 1/02* (2020.01)
  *G01J 5/06* (2022.01)
  *G01J 5/00* (2022.01)
  *G01J 5/068* (2022.01)

(52) U.S. Cl.
  CPC .............. *G05D 1/0251* (2013.01); *G01J 5/06* (2013.01); *G01J 5/068* (2022.01); *G01J 2005/0077* (2013.01); *G05D 2201/0213* (2013.01)

(58) Field of Classification Search
  CPC . G05D 1/0251; G05D 2201/0213; G01J 5/06; G01J 5/068; G01J 2005/0077
  See application file for complete search history.

(56) References Cited

FOREIGN PATENT DOCUMENTS

WO  WO2021/076121  * 10/2019 ............. G01S 7/481

OTHER PUBLICATIONS

Sousa et al. ("Thermal Infrared Sensing for Near Real-Time Data-Driven Fire Detection and Monitoring Systems," Sensors, 2020, 20, p. 6803) (Year: 2020).*

* cited by examiner

*Primary Examiner* — David P Porta
*Assistant Examiner* — Meenakshi S Sahu
(74) *Attorney, Agent, or Firm* — Lee & Hayes, P.C.

(57) ABSTRACT

Techniques associated with generating or tuning parameters associated with long wave infrared sensor data to improve object detection associated with the captured images are discussed herein. The system may determine a region of interest associated with the sensor data and adjust or tune the parameters to improve detection(s) within the region of interest. Additionally, the system may adjust the parameters based on map data and/or environmental conditions, such as weather and temperature.

20 Claims, 7 Drawing Sheets

SYSTEM FOR TUNING PARAMETERS OF A THERMAL SENSOR TO IMPROVE OBJECT DETECTION

BACKGROUND

Autonomous vehicles may use a variety of sensors to capture data for navigating along routes. While navigating, the autonomous vehicles may detect other objects in the environment and predict their behavior using sensor data. Various different sensors may be used to detect objects in different operating conditions and environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
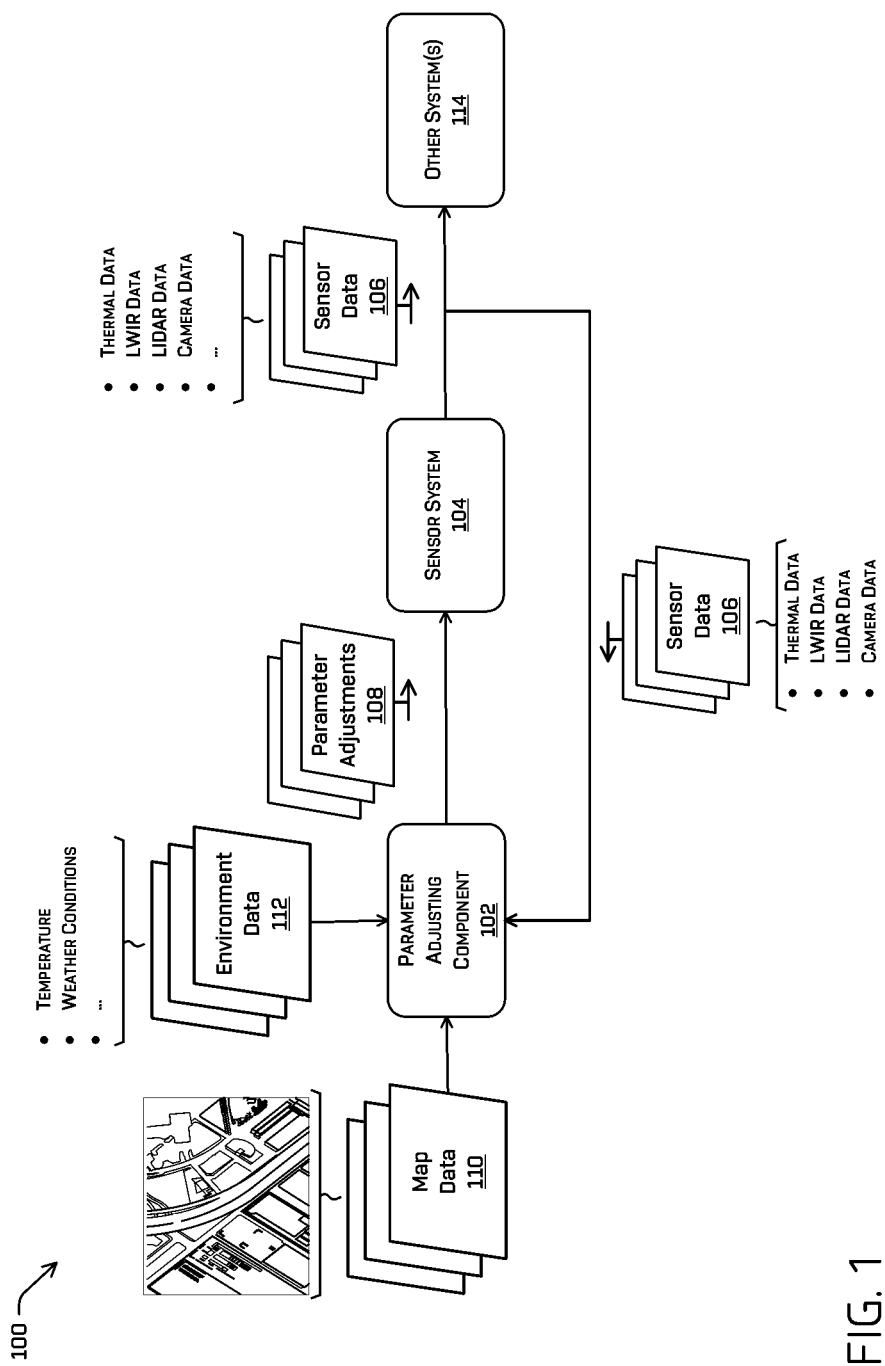
FIG. 1 is an example block-diagram illustrating an example architecture of a parameter adjustment component associated with a sensor system, in accordance with implementations of the disclosure.

Techniques for adjusting parameters for sensors to capture data of an environment are discussed herein. Sensors may be used by a vehicle, such as an autonomous vehicle, to capture data to navigate to a destination. While navigating, the autonomous vehicle may encounter dynamic (e.g., vehicles, pedestrians, animals, and the like) and/or static (e.g., buildings, signage, parked vehicles, and the like) objects in the environment. In order to ensure the safety of the occupants and objects, the decisions and reactions of the autonomous vehicles to events and situations that the vehicle may encounter, the vehicle may be equipped with multiple types and instances of sensors to capture data representative of the environment surrounding the vehicle. In some cases, the types of sensors may include thermal sensors (e.g., long wave infrared (LWIR) sensors, mid-wave infrared (MRIR) sensors, short wave infrared (SWIR) sensors, and the like) in conjunction with other sensors, such as lidar, visible-wavelength cameras (i.e., image capture devices that capture data using visible wavelengths of light), microphones, short range infrared sensors, and the like.

Data from thermal sensor(s) may more clearly represent environments in certain environmental conditions (e.g., nighttime driving conditions, heavy rain, heavy snow, and the like) than other sensor types, such as visible-wavelength cameras. As such, the thermal sensor data may be used to assist with making navigational decisions and overall improve safe operation of the autonomous vehicle. The techniques described herein are directed to various aspects of improving the clarity and ability of the autonomous vehicle to detect objects using the thermal data, predict future behavior of the detected objects, and ultimately make safe operational decisions based on the detected objects.

In some implementations, the autonomous vehicle, a parameter adjustment component, a thermal sensor module, a sensor module including an thermal sensor, and/or a combination of thermal sensor modules may be configured to adjust parameters of the thermal sensor to improve object detection within a desired region of the sensor's field of view. For instance, a parameter adjustment component may be configured to generate a histogram of values of pixels of an image captured by the thermal sensor and to select one or more parameter adjustments for the thermal sensor to improve object detection based on the histogram. In other instances, the parameter adjustment component may detect a region of interest within the image captured by the thermal sensor (e.g., an intersection, bike lane, turn lane, and the like) and to generate the histogram for that region of interest. Again, the parameter adjustment component may then determine parameter adjustments for the thermal sensor to improve object detection based on the histogram of the region of interest. In other examples, the parameter adjustment component may identify the region of interest from images captured by other sensors. For example, the parameter adjustment component may identify a region of low visibility within a visible-light image and generate the histogram of the thermal image corresponding to the region of interest. The parameter adjustment component may then determine parameter adjustments for the thermal sensor to improve object detection based on the histogram of the region of interest.

In other implementations, the parameter adjustment component may be configured to determine areas within a thermal image that are outside an area of interest or to provide overweight values to the histogram. The parameter adjustment component may then remove the pixels associated with the overweight values from consideration when selecting parameters for the thermal sensor. For example, if a large area of the sky is within a field of view of the thermal sensor, the parameter adjustment component may allow the parameters to be adjusted or tuned in a manner in which clarity associated with pixels representing the sky is lost in favor of high clarity along the roadway or sidewalks. In some cases, the sky my be detected using visible-light image data and then a corresponding region of the sky in the thermal image may be excluded from the region of interest.

In some cases, the parameter adjustment component may also receive map data to assist with selecting or setting the parameters of the thermal sensor. For example, the map data may be usable to assist with determining a position of the vehicle (such as heading up or down hills) as well as to provide feedback related to particular location, such as unusually warm or cold areas (e.g., construction sites). In these examples, the parameter adjustment component may adjust one or more settings (such as a gain or saturation) to compensate for the particular location. Similarly, the parameter adjustment component may determine or narrow a region of interest when the map data indicates that the vehicle is driving up a hill to reduce the effect of the sky within the field of view on the clarity of the reminder of the image data. In certain cases, the map data can be used to identify an object or area of interest (e.g., a relatively cold or hot object or area). The object or area of interest can be correlation to a portion of a field of view of a thermal sensor that may be excluded for purposes of thermal sensor parameter adjustment.

In some cases, the parameter adjustment component may also receive environmental data to assist with selecting or setting the parameters of the thermal sensor. For example, if the autonomous vehicle is traveling in an environment experiencing heavy snow and/or rain, the parameter adjustment component may attempt to adjust one or more settings to improve the object detectability within the thermal image data, as the heavy snow and/or rain may cause a drop in an expected temperature. As another example, the environmental data may indicate that the vehicle is traveling through or during an unusually hot day which may reduce the clarity of the thermal image data, particularly in environments containing a large amount of roadways and buildings (such as in a city environment). For instance, the environmental data may include a level of urbanization for the surrounding environment. The parameter adjustment component may then adjust the parameter of the thermal sensor based on the level of urbanization. As one illustrative example, the higher the level of urbanization, the higher the expected temperature range. In this example, the parameter adjustment component may compensate for the higher level of urbanization by increasing a dynamic range or the thermal sensor.

In the examples above, a single thermal sensor and an image sensor are discussed. However, it should be understood, that multiple thermal sensors as well as multiple other sensors (such as multiple visible sensor) having a shared or overlapping field of view may be used to capture the sensor data (e.g., the thermal data, the visible data, and the like). It should also be understood, that the parameter adjustment component may be configured to provide multiple parameter adjustments to each of the multiple thermal sensors sharing the field of view based on the collected data. In some cases, the parameter adjustments for each of the thermal sensors may differ from each other. In this manner, the thermal sensor data from each thermal sensor may be tuned for different or specific regions or interest or types of objects.

In various examples, the parameter adjustment component may be configured to adjust parameters comprising dynamic range, contrast, automatic gain correction, maximum gain, minimum temperature, maximum temperature, tail rejection, region of interest, flat field correction, damping factors, smoothing factors and the like. For example, the parameter adjustment component may increase a minimum temperature of a dynamic range in response to encountering a heavy snowstorm.

FIG. 1 is an example block-diagram illustrating an example architecture 100 of a parameter adjustment component 102 associated with a sensor system 104, in accordance with implementations of the disclosure. In the illustrated example, a sensor system 104 or module may comprise at least one thermal sensor as well as multiple other types of sensors (e.g., image capture devices, lidar capture devices, infrared capture devices, motion sensors, microphones, and the like). Various parameters of the thermal sensor 104 may be tunable or otherwise adjustable to adjust the clarity of the captured sensor data 106 based on various environmental factors (such as time of day, temperature, weather conditions, field of views, surrounding landscape, and the like). For example, the thermal sensor 104 may be tuned or configured for a desired temperature or a temperature range. In cases in which an environmental temperature falls well below and/or well above the desired temperature range, the sensor data may lose clarity, thereby increasing the difficulty associated with identifying distinct objects within the resulting sensor data 106.

The architecture 100, discussed herein, can be configured to include the parameter adjustment component 102 to generate various parameters adjustments 108 and/or settings associated with the thermal sensor system 104 to improve object detection associated with the resulting sensor data 106. In the current example, the parameter adjustment component 102 may receive map data 110 associated with the environment currently surrounding the autonomous vehicle. In some cases, the map data 110 may include elevation data, static object data (e.g., buildings, trees, road signs, etc.), and the like. For example, parameter adjustment component 102 may be configured to determine the parameter adjustments 108 based on static object or landmark data that can be included in the map data 110. The static object data may include material properties, such as thermal proprieties, reflective properties, and the like. The landmark data can indicate a specific object or area that may be detrimental to thermal imaging. A location of the landmark or area can be associated with a corresponding portion of a field of a view of a thermal imaging sensor and precluded for use in adjusting parameter(s) of the thermal imaging sensor, as disclosed herein. Examples of landmark data can include a power plant, a refinery, the sun, building(s), bodies of water, etc.

The parameter adjustment component 102 may be configured to determine the parameter adjustments 108 based on the map data 110. For example, the map data 110 may indicate that the autonomous vehicle is currently traveling through a city environment that includes large amounts of concrete, buildings, and other man-made structures that overall increase the temperature of the environment, particularly in close proximity to the roadways or drivable surfaces. In this example, the parameter adjustment component 102 may identify or determine an increase or delta in temperature caused by the city environment. The parameter adjustment component 102 may then adjust a gain setting, a range setting, and/or a minimum temperature setting to compensate for the increased temperature associated with the current environment.

As another illustrative example, the map data 110 may indicate that the autonomous vehicle is currently traveling up a steep incline. In this example, the thermal sensor system 104 may capture and the sensor data 106 may comprise large amount of sky or otherwise empty space. In these situations, the thermal sensor system 104 may perform dynamic adjustments that attempt to improve clarity over the entire field of view of the sensor 104. However, improving the clarity associated with the sky or empty space, typically, does not impact object detection and/or operational decisions of the autonomous vehicle. As such, in the current example, the parameter adjustment component 102 may be configured to narrow a region of interest applicable to the dynamic adjustment system of the thermal sensor system 104. For instance, the parameter adjustment component 102 may, based at least in part on the map data 110 indicating the incline, cause the region of interest to be reduced to the lower three fourths, lower two thirds, lower half, lower one third, and the like of the field of view of the thermal sensor system 104. In this manner, the thermal sensor 104 may, via a dynamic gain adjustment feature, tune the clarity only within the region of interest selected by the parameter adjustment component 102.

In some implementations, the parameter adjustment component 102 may also receive environment data 112. For example, the environment data 112 may be received from various sources, such as third-party weather reporting systems, sensors on board the autonomous vehicle, as well as sensors on board other nearby vehicles. The environment data 112 may include, as a non-exhaustive list representative list, a current temperature, an expected temperature range, a time of day (e.g., dawn, morning, noon, late afternoon, night, etc.), weather conditions (e.g., rain, snow, hail, etc.), wind direction and/or speed, and the like. For example, the parameter adjustment component may narrow a region of interest, decrease a desired temperature range and the like when the autonomous vehicle is traveling through a snowstorm.

In the illustrated implementation, the parameter adjustment component 102 may utilize recently captured sensor data 106 in adjusting the parameters for a subsequent interval of time. For example, the parameter adjustment component 102 may be configured to generate a histogram representative of pixels associated with the sensor data 106 captured by the thermal sensor system 104. The parameter adjustment component 102 may then generate the parameter adjustments 108 based on the resulting histogram. In some cases, the parameter adjustment component 102 may first parse or analyze the sensor data 106 to determine a region of interest. For example, the sensor data 106 may represent a cross walk, intersection, bike lane, or the like that may be more likely to contain dynamic objects. The parameter adjustment component 102 may then identify the high traffic area as a region of interest. The parameter adjustment component 102 may then generate a histogram over the region of interest and generate the parameter adjustments 108 based on the resulting histogram for only the region of interest.

In this implementation, by incorporating the parameter adjustment component 102 into the architecture of the autonomous vehicle, the clarity of the sensor data 106 may be improved, at least over a region of interest. The higher clarity sensor data 106 may then provide for fewer resources consumed by other systems 114 of the autonomous vehicle with respect to object detection and tracking (such as association, segmentation, and the like).

In certain examples, the parameter adjustment component 102 may identify a region of interest to be excluded as a basis for parameter adjustment for a thermal sensor. For example, the sky may be a region of interest excluded for parameter adjustment. Instead, the thermal sensor may be tuned to better image a region of interest including the ground immediately surrounding a vehicle. By excluding the sky, the thermal sensor may be better tuned to obtain information regarding the ground, for example. The horizon between the ground and the sky may be determined based on map data and/or incline data obtain from a sensor of a vehicle, for example, and may be updated in real time. The horizon may be determined by directly analyzing captured thermal sensor data. In certain examples, the horizon can be augmented based on an environment of the vehicle (e.g., if the vehicle is located in an urban environment, the horizon may be obscured or augmented by building(s). As discussed herein, additional regions of interest to the sky for exclusion can be determined using the disclosed techniques.

Figure 2:
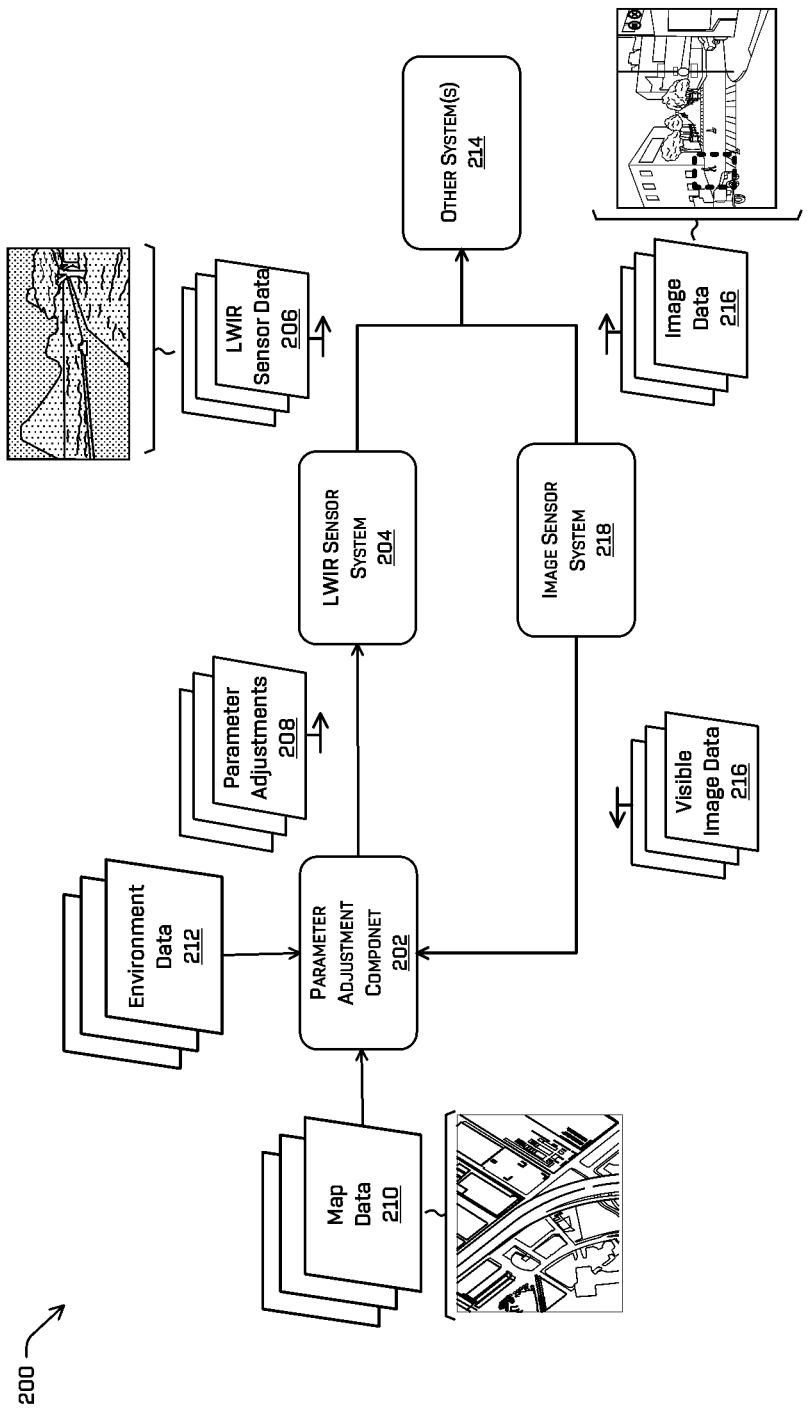
FIG. 2 is another example block-diagram illustrating an example architecture of a parameter adjustment component associated with a sensor system, in accordance with implementations of the disclosure.

FIG. 2 is another example block-diagram illustrating an example architecture 200 of a parameter adjustment component 202 associated with thermal sensor system 204, in accordance with implementations of the disclosure. Similar to the architecture 100 discussed above with respect to FIG. 1, the parameter adjustment component 202 may be configured to generate parameter adjustments 208 for the LWIR sensor system 204 based on map data 210 and/or environment data 212.

In this example, the parameter adjustment system 202 may also receive visible image data 216 from an image sensor system 218 in addition to or in lieu of the LWIR sensor data 208. In this example, the parameter adjustment component 202 may process, parse, or otherwise analyze the visible image data 216 (which may be visible-light data) to determine parameters adjustment for the thermal sensor system 204. For instance, the parameter adjustment component 202 may determine areas represented within the visible image data 216 that are obstructed, unclear, dark, etc. that may result in difficulty for other systems 214 of the autonomous vehicle (such as perception and/or prediction system) to detect and track objects. As an illustrative example, the visible image data 216 may include one or more dark or shadowy areas (such as an alley, covered walkway, and the like). It may be difficult for the perception and/or prediction system to identify objects and predict dynamic motion of the objects using the visible image data 216 within the shadowy areas.

In this example, the parameter adjustment system 202 may identify the dark or shadowy areas within the visible image data 216. The parameter adjustment system 202 may then focus a region of interest for the thermal sensor data 206 to correspond or otherwise align with the dark or shadowy areas within the visible image data 216. In general, the thermal sensor data 206 may more clearly represent objects (such as pedestrians, animals, and the like) despite a lack of visible light data. However, by adjusting the parameters of the thermal sensor systems 204 to increase or improve object detectability of the thermal sensor data 206 at locations corresponding to the dark or shadowy areas, the parameter adjustment system 202 may further reduce the processing or difficulty of the perception and/or prediction system in identifying and tracking objects within the dark or shadowy areas.

In the current example, the parameter adjustment system 202 is discussed with respect to adjusting a region of interest using visible image data 216. However, it should be understood that the parameter adjustment system 202 may adjust any number of parameters associated with the thermal sensor system 204 to adjust resolution. Additionally, the parameter adjustment system 202 may be configured to tune parameters of the thermal sensor system 204 based on other types of sensor data, such as lidar sensors, gyroscopes, temperature sensors, and the like.

Figure 3:
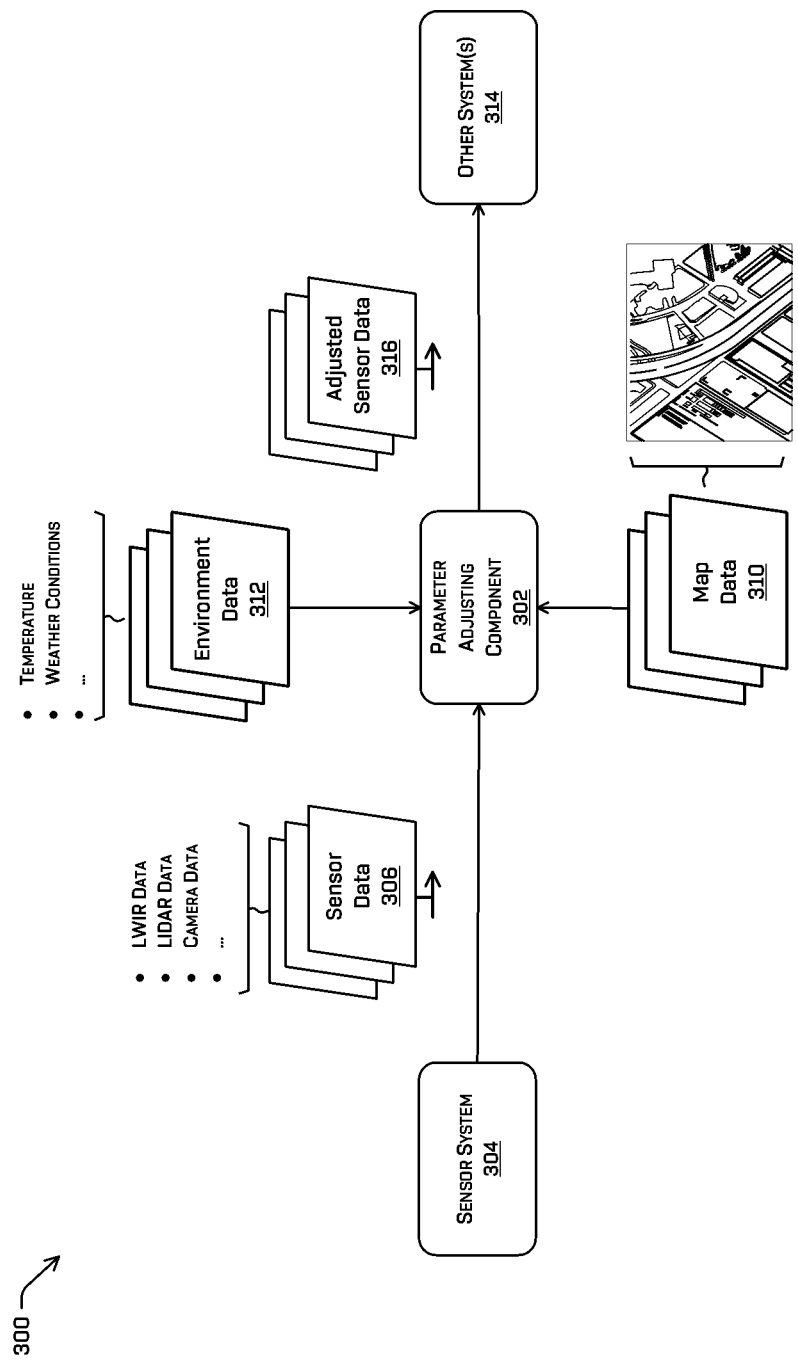
FIG. 3 is another example block-diagram illustrating an example architecture of a parameter adjustment component associated with a sensor system, in accordance with implementations of the disclosure.

FIG. 3 is another example block-diagram illustrating an example architecture 300 of a parameter adjustment component 302 associated with a sensor system 304, in accordance with implementations of the disclosure. Similar to the architecture 100 and 200 discussed above with respect to FIGS. 1 and 2, the parameter adjustment component 302 may be configured to adjust parameters or settings associated with thermal sensor data 306 to improve the accuracy of and reduce the processing resources associated with object detection and tracking.

In the illustrated example, the parameter adjustment component 302 may receive the sensor data 306 as well as the map data 310 and/or the environment data 312 as discussed above. However, in this example, the parameter adjustment component 302 may adjust the sensor data 306 post capture to improve the clarity for a particular region or based on the map data 310 and/or the environment data 312. For example, the parameter adjustment component 302 may apply gain settings to increase the clarity for a particular region (e.g., along the roadway) at the expense of clarity in other areas (e.g., the sky or empty space). In this case, the parameter adjustment component 302 may generate adjusted sensor data 316 and provide the adjusted sensor data 316 to other systems 314 of the autonomous vehicle, such as perception and/or prediction system.

In the examples of FIGS. 1-3 various architectures are shown. It should be understood that aspects of each architecture 100, 200, and/or 300 may be used in combination with each other. For instance, the post sensor data processing discussed with respect to FIG. 3 may be used in conjunction with the parameter adjustment generation of FIGS. 1 and 2.

Figure 4:
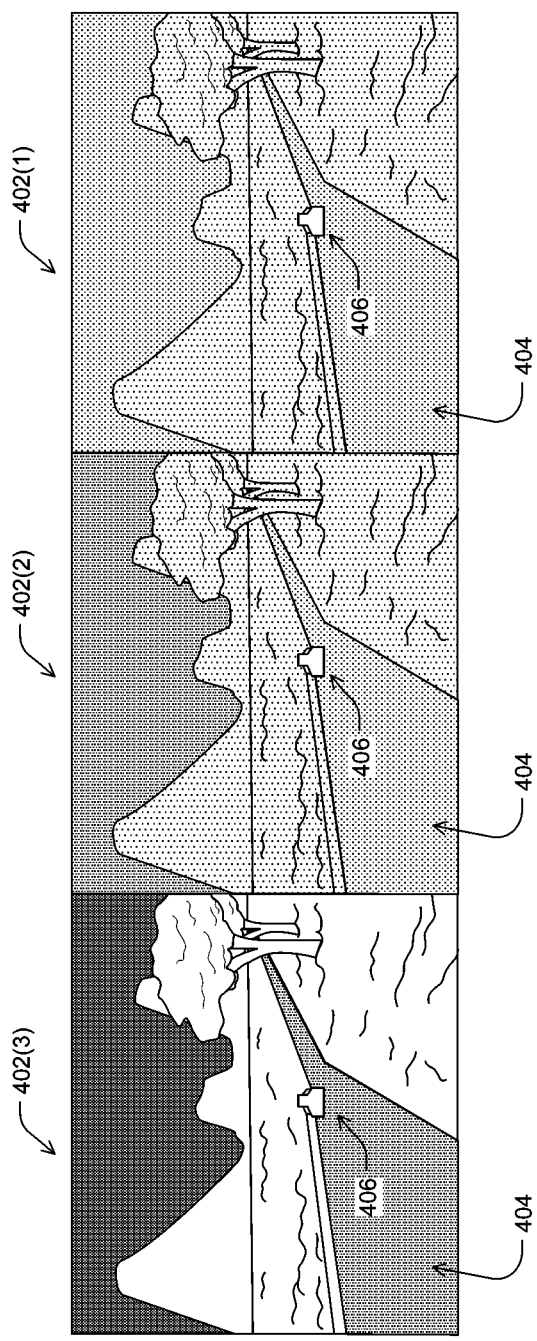
FIG. 4 is an example pictorial view of long wave infrared (LWIR) sensor data with various parameter adjustments, in accordance with implementations of the disclosure.

FIG. 4 is an example pictorial view 400 of thermal sensor data 402(1)-(3) with various parameter adjustments, in accordance with implementations of the disclosure. In the current example, the thermal sensor data 402(1)-(3) is shown with various parameters adjustments to successively improve clarity along the roadway 404. For instance, in the current example, the thermal sensor data 402(1) may include settings tuned to adjust for optimal clarity over the entire image. Thus, in the sensor data 402(1) the sky or upper region of the data 402(1) has some clarity but the important area along the roadway 404 has low contrast and may result in the perception and/or perception system having difficulty in identifying the preceding vehicle 406 as an object.

In the thermal sensor data 402(2) a parameter adjustment component (such as parameter adjustment component 102, 202, and/or 302 of FIGS. 1-3) may have adjusted a parameter, such as a dynamic range parameter, contrast parameter, automatic gain correction parameter, maximum gain parameter, minimum temperature parameter, maximum temperature parameter, tail rejection parameter, damping parameter, smoothing parameter and the like. As such, in the sensor data 402(2) the preceding vehicle 406 has become more distinguished when compared with the background environment than in the thermal sensor data 402(1).

In the thermal sensor data 402(3) the parameter adjustment component may have selected a region of interest associated with the ground plane and adjusted the parameters to improve clarity along the ground at the expensive of clarity within the sky. For instance, the sky has become mostly dark and indistinguishable while the preceding vehicle 406 has become clearer within the sensor data 402(3) with respect to the roadway 404.

Figure 5:
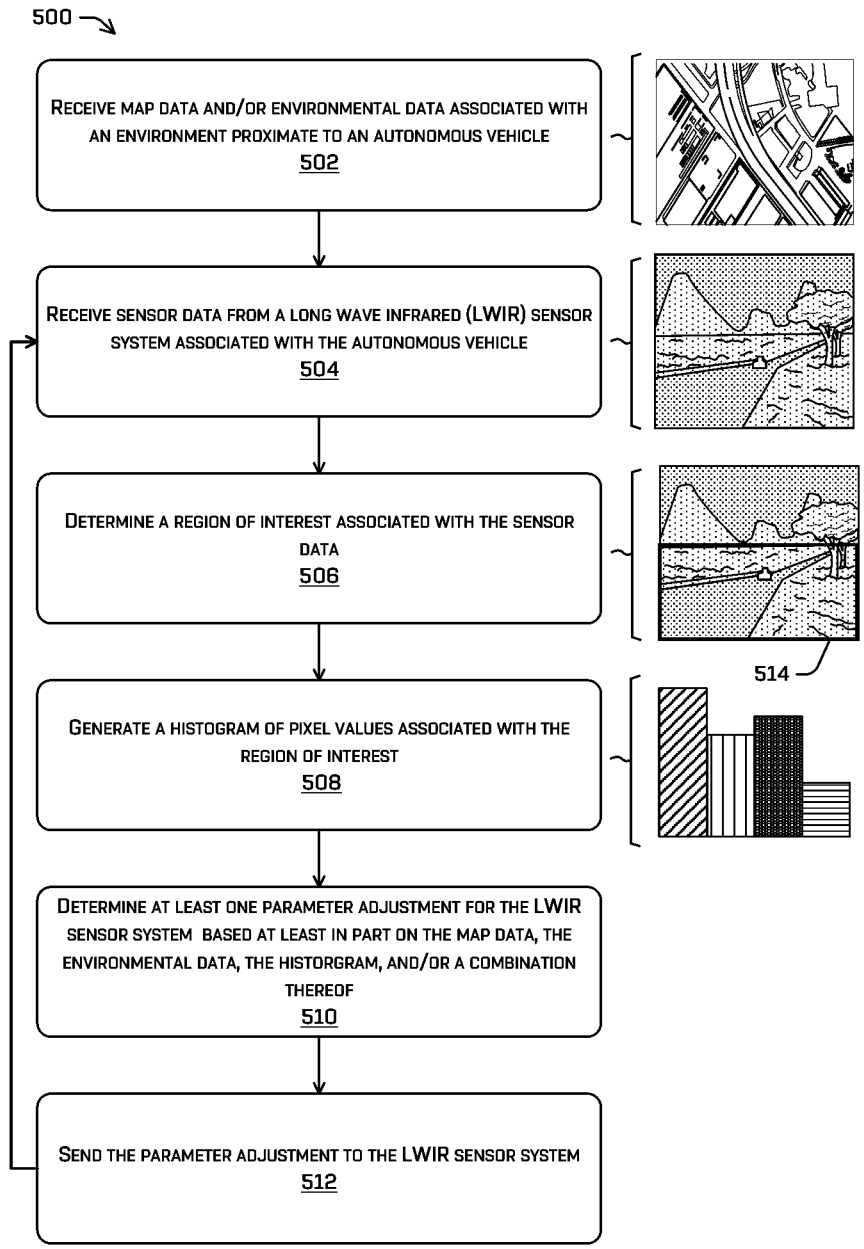
FIG. 5 is a flow diagram illustrating an example process associated with determining parameter adjustments for a LWIR sensor system, in accordance with implementations of the disclosure.

FIG. 5 is a flow diagram illustrating an example process 500 associated with determining parameter adjustments for a thermal sensor system, in accordance with implementations of the disclosure. As discussed above, the thermal sensor data may more clearly represent surrounding environments than other sensors associated with an autonomous vehicle in certain environmental conditions, such as at night, in heavy rain or snow, within fog, and the like. However, in some situations, the thermal sensor data may become saturated or otherwise lose clarity, such as when the thermal sensor system is exposed to large ranges in temperatures across the field of view. Therefore, a parameter adjustment component may be configured to adjust parameter sensors to improve clarity of the thermal sensor data during operation.

At 502, the parameter adjustment component of an autonomous vehicle may receive map data and/or environmental data associated with an environment proximate to an autonomous vehicle. The map data may include elevation data, static object data (e.g., buildings, road signs, cross walks, bike lanes, traffic lights, benches, and the like). The environmental data may include weather conditions, temporary obstructions (such as construction, detours, and the like), time of day, season, and the like.

At 504, the parameter adjustment component may receive sensor data from a thermal sensor system associated with the autonomous vehicle. For example, the sensor data may be associated with an interval of time proceeding the current time.

At 506, the parameter adjustment component may determine a region of interest associated with the sensor data. For example, the parameter adjustment component may determine a region that has poor object detectability, an area of high traffic (such as a cross walk or bike lane, intersection, or other area likely to contain dynamic objects), or the like, as a region of interest. In other cases, the parameter adjustment component may identify largely empty spaces (such as the sky, large buildings, empty fields, and the like) as areas to exclude from the region of interest.

As an illustrative example, when driving long a country road, large portions of the field of view may include empty fenced farmland in which it is highly unlikely to include a dynamic object capable of entering a drivable area. However, the thermal sensor system may reduce clarity associated with the roadway in favor of increased clarity associated with the farmland. Thus, the parameter adjustment component may identify the empty fenced farmland as an area to exclude from a region of interest 514 based on the sensor data and/or the map data. In this manner, the parameter adjustment component may cause the thermal sensor system to automatically tune parameters for the high traffic areas (e.g., the roadway in this example), thereby improving clarity along the roadway at the expense of clarity within the fenced farmland.

In certain examples, an object or area within a field of view of a visual sensor can be used to identify objects or areas that would be detrimental to thermal imaging for an autonomous vehicle. For example, the sun or a relatively hot or cold area/object (exceeding a temperature threshold) can be identified. Such areas/object may be detrimental to LWIR imaging by, for example, causing a dynamic range of a thermal sensor to include a relatively high or low temperature to be included within the range. By excluding these areas/object, more steps can be assigned to a range more useful for autonomous driving (e.g., to gather more information around grounded features in the vicinity of the vehicle).

At 508, the parameter adjustment component may generate a histogram of pixel values associated with the region of interest 514. For example, the histogram may be utilized to represent an overall clarity associated with the region of interest 514, a temperature gradient associated with the region of interest 514, an average temperature associated with the region of interest, a maximum and/or minimum temperature associated with the region of interest 514, a maximum and/or minimum clarity associated with the region of interest 514, and the like.

At 510, the parameter adjustment component may determine at least one parameter adjustment for the thermal sensor system, based at least in part on the map data, the environmental data, the histogram and/or a combination thereof. For instance, in various implementations, the parameter adjustment component may determine parameter adjustments associated with a dynamic range, contrast, automatic gain correction, maximum gain, minimum temperature, maximum temperature, tail rejection, flat field correction, damping factors, smoothing factors and the like.

As an illustrative example, the parameter adjustment component may increase a minimum temperature of a dynamic range in response to the environmental data indicating the autonomous vehicle is traveling through a heavy snowstorm. In another illustrative example, the parameter adjustment component may adjust the dynamic range to improve clarity in regard to a smaller temperature gradient than expected within the region of interest 514.

At 512, the parameter adjustment component may send the parameter adjustment to the thermal sensor system. In some cases, the sensor data may advance to a prediction and/or perception system of the autonomous vehicle, such that the autonomous vehicle may determine operational decisions based at least in part on the sensor data, and the parameter adjustments may be sent to the thermal sensor system. The thermal sensor system may then apply the parameter adjustments to the sensor data captured during the next interval.

Figure 6:
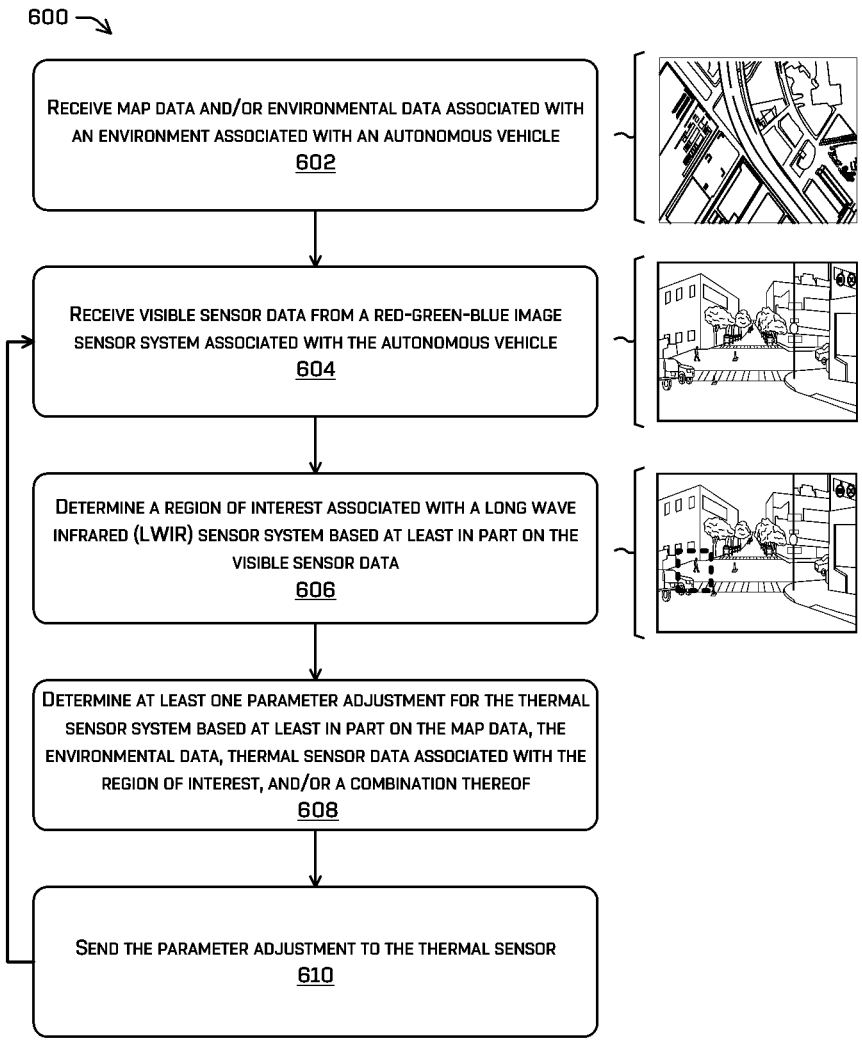
FIG. 6 is another flow diagram illustrating an example process associated with determining parameter adjustments for a LWIR sensor system, in accordance with implementations of the disclosure.

FIG. 6 is another flow diagram illustrating an example process 600 associated with determining parameter adjustments for a thermal sensor system, in accordance with implementations of the disclosure. In some cases, the thermal sensor system may be used in conjunction with and/or to supplement other sensor systems in capturing data for use in operational decision making by an autonomous vehicle. In these cases, a parameter adjustment component associated with the thermal sensor system may be configured to determine parameter adjustments for the thermal sensor system based at least in part on the other sensor data, such as visible image or sensor data.

At 602, the parameter adjustment component of an autonomous vehicle may receive map data and/or environmental data associated with an environment proximate to an autonomous vehicle. The map data may include elevation data, static object data (e.g., buildings, road signs, cross walks, bike lanes, traffic lights, benches, and the like). The environmental data may include weather conditions, temporary obstructions (such as construction, detours, and the like), time of day, season, and the like.

At 604, the parameter adjustment component may receive visible sensor data from a visible image sensor system associated with the autonomous vehicle. For instance, in some examples, the visible sensor data may include areas that are obstructed, unclear, dark, shadowy, and the like. These obstructed, unclear, dark, and/or shadowy areas within the visible sensor data may result in difficulties for other systems of the autonomous vehicles when making operational decisions. For instance, a dark or shadowy region may contain a dynamic object (such as a pedestrian) that is not detectable in the visible sensor data due to the shadow or darkness.

At 606, the parameter adjustment component may determine a region of interest associated with the thermal sensor system based at least in part on the visible sensor data. For example, the parameter adjustment component may process, parse, or otherwise analyze the visible sensor data to determine an area, such as a region in the visible sensor data that corresponds to areas that are obstructed, unclear, dark, shadowy, and the like. In some cases, the parameter adjustment component may identify areas within the visible sensor data that are both unclear or dark and likely to contain dynamic objects, such as an alleyway next to the road, an overgrown area of a sidewalk, an exit to a fenced yard, and the like. In some cases, the unclear or dark region may be identified as an area where objects are indistinguishable using the visible image data or the boundary between objects is be defined within a threshold level of certainty.

In this example, the parameter adjustment system may then set or determine a region of interest for the thermal sensor system to correspond or otherwise aligned with the area identified within the visible sensor data. For instance, the sensor data generated by the thermal sensor system may more clearly represent different objects (such as pedestrians, animals, and the like) despite the lack of light or clear visibility.

At 608, the parameter adjustment component may determine at least one parameter adjustment for the thermal sensor system based at least in part on the map data, the environmental data, the histogram and/or a combination thereof. For instance, in various implementations, the parameter adjustment component may determine parameter adjustments associated with a dynamic range, contrast, automatic gain correction, maximum gain, minimum temperature, maximum temperature, tail rejection, flat field correction, damping factors, smoothing factors and the like.

At 610, the parameter adjustment component may send the parameter adjustment to the thermal sensor system. In some cases, the sensor data may advance to a prediction and/or perception system of the autonomous vehicle, such that the autonomous vehicle may determine operational decisions based at least in part on the sensor data, and the parameter adjustments may be sent to the thermal sensor system. The thermal sensor system may then apply the parameter adjustments to the sensor data captured during the next interval.

Figure 7:
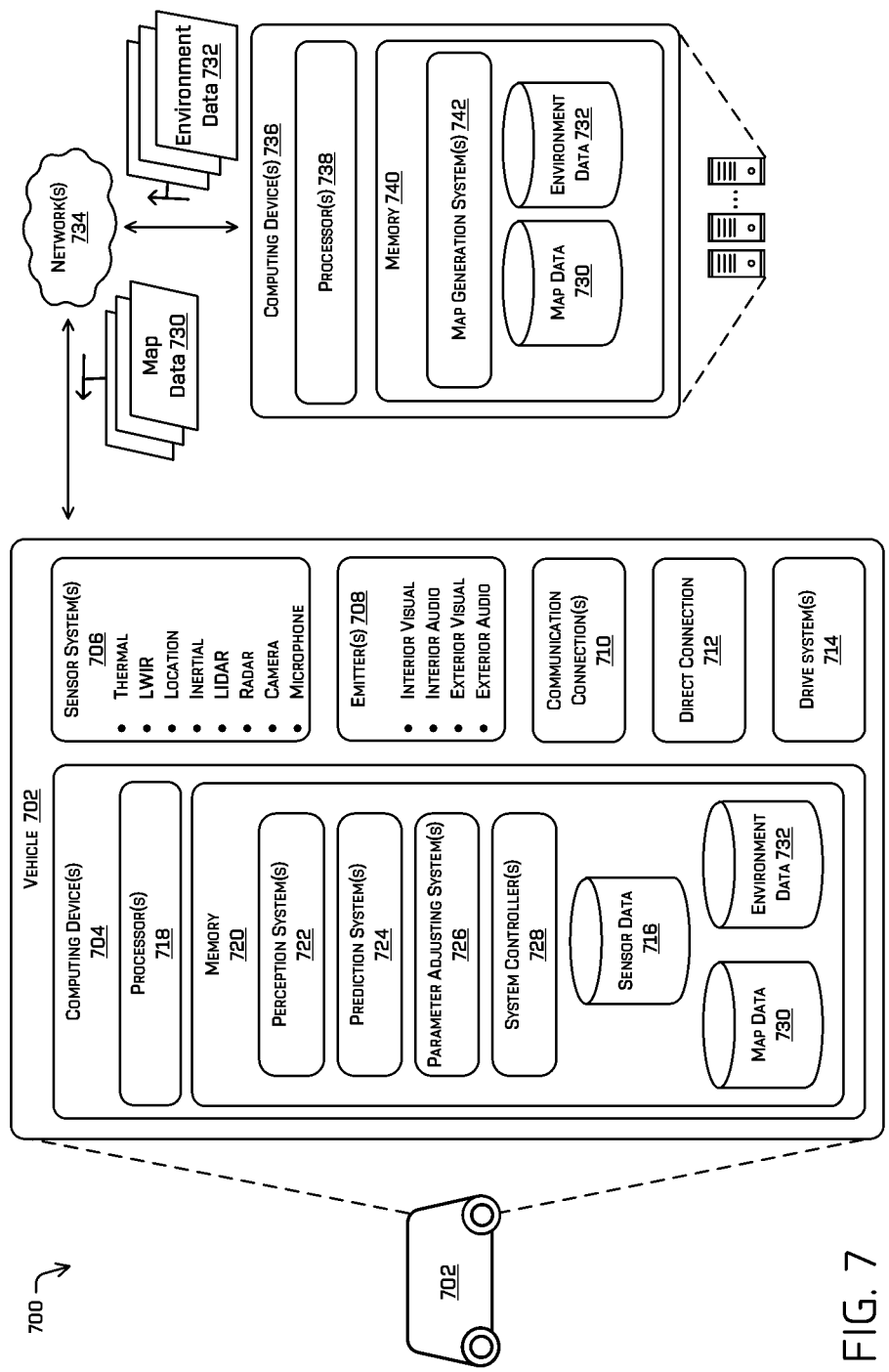
FIG. 7 depicts a block diagram of an example system for implementing the techniques discussed herein.

FIG. 7 depicts a block diagram of an example system 700 for implementing the techniques discussed herein. In at least one example, the system 700 may include a vehicle 702, such the autonomous vehicles discussed above. The vehicle 702 may include computing device(s) 704, one or more sensor system(s) 706 (such as an thermal sensor system discussed above), one or more emitter(s) 708, one or more communication connection(s) 710 (also referred to as communication devices and/or modems), at least one direct connection 712 (e.g., for physically coupling with the vehicle 702 to exchange data and/or to provide power), and one or more drive system(s) 714. The one or more sensor system(s) 706 may be configured to capture the sensor data 716 associated with a surrounding physical environment.

In at least some examples, the sensor system(s) 706 may include thermal sensors (e.g., LWIR sensors), time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., visible, RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 706 may include multiple instances of each type of sensors. For instance, time-of-flight sensors may include individual time-of-flight sensors located at the corners, front, back, sides, and/or top of the vehicle 702. As another example, camera sensors may include multiple cameras disposed at various locations about the exterior and/or interior of the vehicle 702. In some cases, the sensor system(s) 706 may provide input to the computing device(s) 704.

The vehicle 702 may also include one or more emitter(s) 708 for emitting light and/or sound. The one or more emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 708 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 702 can also include one or more communication connection(s) 710 that enable communication between the vehicle 702 and one or more other local or remote computing device(s) (e.g., a remote teleoperations computing device) or remote services. For instance, the communication connection(s) 710 can facilitate communication with other local computing device(s) on the vehicle 702 and/or the drive system(s) 714. Also, the communication connection(s) 710 may allow the vehicle 702 to communicate with other nearby computing device(s) (e.g., other nearby vehicles, traffic signals, etc.).

The communications connection(s) 710 may include physical and/or logical interfaces for connecting the computing device(s) 704 to another computing device or one or more external network(s) 734 (e.g., the Internet). For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 710 may comprise the one or more modems as described in detail above.

In at least one example, the vehicle 702 may include one or more drive system(s) 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 can include one or more sensor system(s) 706 to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 714. In some cases, the sensor system(s) 706 on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which may receive and preprocess data from the sensor system(s) 706 and to control operation of the various vehicle systems. In some examples, the drive system controller can include one or more processor(s) and memory communicatively coupled with the one or more processor(s). The memory can store one or more modules to perform various functionalities of the drive system(s) 714. Furthermore, the drive system(s) 714 also include one or more communication connection(s) that enable communication by the respective drive system with one or more other local or remote computing device(s).

The computing device(s) 704 may include one or more processors 718 and one or more memories 720 communicatively coupled with the processor(s) 718. In the illustrated example, the memory 720 of the computing device(s) 704 stores perception systems(s) 722, prediction systems(s) 724, parameter adjustment systems(s) 726, as well as one or more system controller(s) 728. The memory 720 may also store data such as sensor data 716 captured or collected by the one or more sensors systems 706, map data 730 and environment data 732. Though depicted as residing in the memory 720 for illustrative purposes, it is contemplated that the perception systems(s) 722, prediction systems(s) 724, parameter adjustment systems(s) 726, as well as one or more system controller(s) 728 may additionally, or alternatively, be accessible to the computing device(s) 704 (e.g., stored in a different component of vehicle 702 and/or be accessible to the vehicle 702 (e.g., stored remotely).

The perception system 722 may be configured to perform object detection, segmentation, and/or classification on the sensor data 716, such as the thermal sensor data and/or the visible sensor data as discussed above. In some examples, the perception system 722 may generate processed perception data from the sensor data 716. The perception data may indicate a presence of objects that are in physical proximity to the vehicle 702 and/or a classification or type of the objects (e.g., car, pedestrian, cyclist, building, tree, road surface, curb, sidewalk, unknown, etc.). In additional and/or alternative examples, the perception system 722 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographic position, an indication of darkness/light, etc. For example, details of classification and/or segmentation associated with a perception system are discussed in U.S. application Ser. No. 15/820,245, which are herein incorporated by reference in their entirety.

The prediction system 724 may be configured to determine a track corresponding to an object identified by the perception system 722. For example, the prediction system 724 may be configured to predict a velocity, position, change in trajectory, or otherwise predict the decisions and movement of the identified objects. For example, the prediction system 724 may include one or more machine learned models that may, based on inputs such as object type or classification and object characteristics, output predicted characteristics of the object at one or more future points in time. For example, details of predictions systems are discussed in U.S. application Ser. Nos. 16/246,208 and 16/420,050, which are herein incorporated by reference in their entirety.

The parameter adjustment system 726 may be configured to determine adjustment parameters for the thermal sensor system based at least in part on the sensor data 716, the map data 730, and/or the environment data 732. For instance, a parameter adjustment system 726 may be configured to generate a histogram of the values of the pixels of an image represented in the thermal sensor data and to select one or more parameter adjustments for the thermal sensor to improve clarity based on the histogram. In other instances, the parameter adjustment system 726 may detect a region of interest within the image represented in the thermal sensor data and generate the histogram for that region of interest. Again, the parameter adjustment system 726 may determine parameter adjustments for the thermal sensor to improve clarity based on the histogram of the region of interest. In other examples, the parameter adjustment system 726 may identify the region of interest from sensor data 716 captured by other sensors. For example, the parameter adjustment system 726 may identify a region of low visibility or clarity within a visible image data and generate the histogram of the thermal data for a region of interest corresponding to the region of low visibility in the visible image data. The parameter adjustment system 726 may then determine parameter adjustments for the thermal sensor to improve clarity based on the histogram of the region of interest.

In other implementations, the parameter adjustment system 726 may be configured to determine areas within a thermal image that are outside an area of interest. The parameter adjustment system 726 may then remove the pixels associated with the overweight values from consideration when selecting the parameters for the thermal sensor system. For example, if a large area of the sky is within the field of view of the thermal sensor system, the parameter adjustment system 726 may allow the parameters to be adjusted or tuned in a manner in which the clarity associated with pixels representing the sky is lost in favor of high clarity along the roadway or sidewalks.

In some cases, the parameter adjustment system 726 may also receive map data 730 to assist with selecting or setting the parameters of the thermal sensor system. For example, the map data 730 may be usable to assist with determining a position of the vehicle 702 (such as heading up or down hills) as well as to provide feedback related to particular location, such as unusually warm or cold areas (e.g., construction sites). In these examples, the parameter adjustment system 726 may adjust one or more settings (such as a gain or saturation) to compensate for the particular location. Similarly, the parameter adjustment system 726 may determine or narrow a region of interest when the map data 730 indicates that the vehicle 702 is driving up a hill to reduce the effect of the sky within the field of view on the clarity of the reminder of the sensor data 716.

In some cases, the parameter adjustment system 726 may also receive environmental data 732 to assist with selecting or setting the parameters of the thermal sensor. For example, if the vehicle 702 is traveling in an environment experiencing heavy snow and/or rain, the parameter adjustment system 726 may attempt to adjust one or more settings to improve the clarity of the thermal image data, as the heavy snow and/or rain may cause a drop in an expected temperature. As another example, the environmental data 732 may indicate that the vehicle 702 is traveling through or during an unusually hot day which may reduce the clarity of the thermal image data, particularly in environments containing a large amount of roadways and buildings (such as in a city environment).

In at least one example, the computing device(s) 704 may store one or more and/or system controllers 728, which may be configured to control steering, propulsion, braking, safety, emitters, communication, and other systems of the vehicle 702. The system controllers 728 may communicate with and/or control corresponding systems of the drive system(s) 714 and/or other components of the vehicle 702, which may be configured to operate in accordance with a route provided from a planning system.

In some implementations, the vehicle 702 may connect to computing device(s) 736 via the network(s) 734. For example, the computing device(s) 736 may generate and provide the map data 730 and/or the environment data 732 to the vehicle 702. The computing device 736 may include one or more processor(s) 738 and memory 740 communicatively coupled with the one or more processor(s) 738. In at least one instance, the processor(s) 738 may be similar to the processor(s) 718 and the memory 740 may be similar to the memory 720. In the illustrated example, the memory 740 of the computing device(s) 736 stores the map data 730 and the environment data 732. The memory 740 may also store a map generation system 742 to assist with compiling and generating the map data 730.

The processor(s) 718 of the computing device(s) 704 and the processor(s) 738 of the computing device(s) 736 may be any suitable processor capable of executing instructions to process data and perform operations as described herein. By way of example and not limitation, the processor(s) 718 and 738 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 720 of the computing device(s) 704 and the memory 740 of the computing device(s) 736 are examples of non-transitory computer-readable media. The memory 720 and 740 can store an operating system and one or more software applications, instructions, programs, and/or data to implement the methods described herein and the functions attributed to the various systems. In various implementations, the memory 720 and 740 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. In some instances, aspects of some or all of the components discussed herein can include any models, algorithms, and/or machine learning algorithms. For example, in some instances, the components in the memory 720 and 740 can be implemented as a neural network.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 7 may utilize the processes and flows of FIGS. 1-7.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A. An system comprising: one or more processors; and one or more non-transitory computer-readable media storing instructions that, when executed by the one or more processors, cause the one or more processors to perform operations comprising: receiving visible sensor data from an image capture sensor associated with an autonomous vehicle; identifying an area within the visible sensor data that contains a feature detrimental to LWIR imaging for the autonomous vehicle; determining, based at least in part on the visible sensor data and the area, a first region of interest; determining a second region of interest associated with a long wave infrared (LWIR) sensor associated with the autonomous vehicle, the second region of interest corresponding to the first region of interest; receiving LWIR sensor data from the LWIR sensor; determining, based at least in part on pixel values of LWIR sensor data associated the second region of interest, a histogram; determining, based on the histogram, a parameter adjustment for the LWIR sensor; and causing the LWIR sensor to apply the parameter adjustment.

B. The system of claim A, wherein determining the first region of interest includes determining a region that is obstructed from view by the visible sensor.

C. The system of claim A, wherein the area includes sky.

D. The system of claim A, wherein the feature corresponds to a temperature exceeding a threshold.

E. The system of claim A, wherein the operations further comprise: receiving map data and environmental data associated with an environment proximate to the autonomous vehicle, and wherein determining the parameter adjustment is based at least in part on the map data and the environmental data.

F. A method comprising: receiving first sensor data from a thermal sensor associated with an autonomous vehicle; receiving second sensor data from a visible image sensor associated with the autonomous vehicle; determining, based at least in part on the second sensor data, a first region of interest; determining, based at least in part on the first region of interest, a second region of interest associated with the first sensor data; determining, based at least in part on the second region of interest, a parameter adjustment for the thermal sensor; and applying the parameter adjustment to the thermal sensor or data obtained from the thermal sensor.

G. The method of paragraph F, wherein the first region of interest associated with the second sensor data comprises an obstructed region of the second sensor data.

H. The method of paragraph F, further comprising: determining, based at least in part on the second region of interest, a histogram, wherein the parameter adjustment is based at least in part on the histogram.

I. The method of paragraph F, further comprising: receiving map data associated with an environment proximate the autonomous vehicle; and determining the parameter adjustment for the thermal sensor further based at least in part on the map data.

J. The method of paragraph I, further comprising: receiving weather data associated with an environment proximate the autonomous vehicle; and determining the parameter adjustment for the thermal sensor further based at least in part on the weather data.

K. The method of paragraph F, further comprising: receiving environmental data associated with an environment proximate the autonomous vehicle; and determining the parameter adjustment for the thermal sensor further based at least in part on the environmental data.

L. The method of paragraph F, wherein determining the first region of interest associated with the second sensor data further comprises identifying an empty region associated with the second sensor data and excluding the empty region from the first region of interest.

M. The method of paragraph F, wherein the thermal sensor is a long wave infrared (LWIR) sensor.

N. A non-transitory computer-readable medium storing instructions that, when executed, cause one or more processors to perform operations comprising: receiving first sensor data from thermal sensor associated with an autonomous vehicle; receiving second sensor data from an image sensor associated with the autonomous vehicle; determining, based at least in part on the second sensor data, a first region of interest; determining, based at least in part on the first region of interest, a second region of interest associated with the first sensor data; determining, based at least in part on the second region of interest, a parameter adjustment for the thermal sensor; and applying the parameter adjustment to the thermal sensor or data obtained from the thermal sensor.

O. The non-transitory computer-readable medium of paragraph N, wherein the first region of interest associated with the second sensor data comprises an obstructed region of the second sensor data.

P. The non-transitory computer-readable medium of paragraph N, wherein the operations further comprise: determining, based at least in part on the second region of interest, a histogram, wherein the parameter adjustment is based at least in part on the histogram.

Q. The non-transitory computer-readable medium of paragraph N, wherein the operations further comprise: receiving map data associated with an environment proximate the autonomous vehicle; and determining the parameter adjustment for the thermal sensor further based at least in part on the map data.

R. The non-transitory computer-readable medium of paragraph N, wherein the operations further comprise: receiving environmental data associated with an environment proximate the autonomous vehicle; and determining the parameter adjustment for the thermal sensor further based at least in part on the environmental data.

S. The non-transitory computer-readable medium of paragraph N, wherein determining the first region of interest associated with the second sensor data further comprises identifying an empty region associated with the second sensor data and excluding the empty region from the first region of interest.

T. The non-transitory computer-readable medium of paragraph N, wherein the thermal sensor is a long wave infrared (LWIR) sensor.

U. A system comprising: one or more processors; and one or more non-transitory computer-readable media storing instructions that, when executed by the one or more processors, cause the one or more processors to perform operations comprising: receiving long wave infrared (LWIR) sensor data from a LWIR sensor associated with an autonomous vehicle; receiving map data associated with an environment surrounding the autonomous vehicle; receiving environmental data associated with the environment surrounding the autonomous vehicle; determining, based at least in part on the LWIR sensor data, the map data, and the environmental data, a region of interest associated with at least a portion of the LWIR sensor data; determining, based at least in part on pixel values of the LWIR sensor data associated with the region of interest, a parameter adjustment for the LWIR sensor; and causing the LWIR sensor to apply the parameter adjustment.

V. The system vehicle of claim U, wherein: the environmental data includes weather data; and determining the parameter adjustment for the LWIR sensor is based at least in part on a weather condition indicated by the weather data.

W. The system vehicle of claim U, wherein the map data further comprises elevation data and the operations further comprise: receiving orientation data of the vehicle from an orientation sensor; and wherein determining the region of interest is based at least in part on an elevation data and the orientation data.

X. The system vehicle of claim U, wherein the operations further comprise: receiving visible sensor data from a visible image sensor associated with the autonomous vehicle, and wherein determining the region of interest associated with at least the portion of the LWIR sensor data is based at least in part on the visible sensor data.

Y. The system vehicle of claim U, wherein the environmental data includes a characterization of environment surround the autonomous vehicle of a level of urbanization of the environment.

Z. A method comprising: receiving sensor data from a thermal sensor associated with an autonomous vehicle; receiving map data or weather data associated with an environment proximate the autonomous vehicle; determining, based at least in part on the sensor data and at least one of the map data or the weather data, a parameter adjustment for the thermal sensor based on; and applying the parameter adjustment to the thermal sensor or data from the thermal sensor.

AA. The method of paragraph Z, wherein the weather data indicates a temperature or environmental condition associated with the environment and the parameter adjustment is based at least in part on the temperature.

AB. The method of paragraph Z, wherein: the map data includes static object data; and determining the parameter adjustment is based at least in part on a property of the static object.

AC. The method of paragraph Z, wherein: the map data includes static object data; and determining the parameter adjustment is based at least in part on a relative location of the static object with respect to a position of the autonomous vehicle.

AD. The method of paragraph Z, further comprising: determining, based at least in part on the map data, a region of interest associated with the thermal sensor data; generating, based at least in part on the region of interest, a histogram associated with pixel values of the thermal sensor data; and wherein the parameter adjustment is based on the histogram.

AE. The method of paragraph AD, wherein determining the region of interest associated with the thermal sensor data further comprises determining a region associated with an empty region and excluding the empty region from the region of interest.

AF. The method of paragraph AE, wherein the empty region represent sky.

AG. The method of paragraph AD, further comprising: receiving visible image data from an image sensor associated with the autonomous vehicle; and wherein determining the region of interest associated with the LWIR sensor data further comprises: determining an occluded region of the visible image data; and identifying the region of interest as a portion of the LWIR sensor data that corresponds to the occluded region of the visible image data.

AH. One or more non-transitory computer-readable media storing instructions that, when executed, cause one or more processors to perform operations comprising: receiving sensor data from a thermal sensor associated with an autonomous vehicle; receiving map data or weather data associated with an environment proximate the autonomous vehicle; determining, based at least in part on the sensor data and at least one of the map data or the weather data, a parameter adjustment for the thermal sensor based on; and applying the parameter adjustment to the thermal sensor or data from the thermal sensor.

AI. The non-transitory computer-readable medium of paragraph AH, wherein the weather data indicates a temperature associated with the environment and the parameter adjustment is based at least in part on the temperature.

AJ. The non-transitory computer-readable medium of paragraph AH, wherein the weather data indicates an environmental condition and the parameter adjustment is based at least in part on the environmental condition.

AK. The non-transitory computer-readable medium of paragraph AH, further comprising determining a pose of the autonomous vehicle and wherein the parameter adjustment is based at least in part on the pose.

AL. The non-transitory computer-readable medium of paragraph AH, further comprising: determining, based at least in part on the map data, a region of interest associated with the thermal sensor data; generating, based at least in part on the region of interest, a histogram associated with pixel values of the thermal sensor data; and wherein the parameter adjustment is based on the histogram.

AM. The non-transitory computer-readable medium of paragraph AL, wherein determining the region of interest associated with the LWIR sensor data further comprises determining a region associated with an empty region, and excluding the region from the region of interest.

AN. The non-transitory computer-readable medium of paragraph AL, further comprising: receiving visible image data from an image sensor associated with the autonomous vehicle; and wherein determining the region of interest associated with the thermal sensor data further comprises: determining an occluded region of the visible image data; and identifying the region of interest as a portion of the thermal sensor data that corresponds to the occluded region of the visible image data.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-AN.

What is claimed is:

1. A system comprising:
one or more processors; and
one or more non-transitory computer-readable media storing instructions that, when executed by the one or more processors, cause the one or more processors to perform operations comprising:
receiving long wave infrared (LWIR) sensor data from a LWIR sensor associated with an autonomous vehicle;
receiving map data associated with an environment surrounding the autonomous vehicle;
receiving environmental data associated with the environment surrounding the autonomous vehicle;
determining, based at least in part on the LWIR sensor data, the map data, and the environmental data, a region of interest associated with at least a portion of the LWIR sensor data;
determining, based at least in part on pixel values of the LWIR sensor data associated with the region of interest, a parameter adjustment for the LWIR sensor; and
causing the LWIR sensor to apply the parameter adjustment.

2. The system as recited in claim 1, wherein:
the environmental data includes weather data; and
determining the parameter adjustment for the LWIR sensor is based at least in part on a weather condition indicated by the weather data.

3. The system as recited in claim 1, wherein the map data further comprises elevation data and the operations further comprise:
receiving orientation data of the vehicle from an orientation sensor; and
wherein determining the region of interest is based at least in part on an elevation data and the orientation data.

4. The system as recited in claim 1,
wherein the operations further comprise:
receiving visible sensor data from a visible image sensor associated with the autonomous vehicle, and
wherein determining the region of interest associated with at least the portion of the LWIR sensor data is based at least in part on the visible sensor data.

5. The system as recited in claim 1, wherein the environmental data includes a characterization of environment surround the autonomous vehicle of a level of urbanization of the environment.

6. A method comprising:
receiving sensor data from a thermal sensor associated with an autonomous vehicle;
receiving map data or weather data associated with an environment proximate the autonomous vehicle;
determining, based at least in part on the sensor data and at least one of the map data or the weather data, a parameter adjustment for the thermal sensor; and
applying the parameter adjustment to the thermal sensor or data from the thermal sensor.

7. The method as recited in claim 6, wherein the weather data indicates a temperature or environmental condition associated with the environment and the parameter adjustment is based at least in part on the temperature.

8. The method as recited in claim 6, wherein:
the map data includes static object data; and
determining the parameter adjustment is based at least in part on a property of the static object data.

9. The method as recited in claim 6, wherein:
the map data includes static object data; and
determining the parameter adjustment is based at least in part on a relative location of the static object data with respect to a position of the autonomous vehicle.

10. The method as recited in claim 6, further comprising:
determining, based at least in part on the map data, a region of interest associated with the sensor data;
generating, based at least in part on the region of interest, a histogram associated with pixel values of the thermal sensor data; and
wherein the parameter adjustment is based on the histogram.

11. The method as recited in claim 10, wherein determining the region of interest associated with the sensor data further comprises determining a region associated with an empty region and excluding the empty region from the region of interest.

12. The method as recited in claim 11, wherein the empty region represents sky.

13. The method as recited in claim 10, further comprising:
receiving visible image data from an image sensor associated with the autonomous vehicle; and wherein determining the region of interest associated with the thermal sensor data further comprises:
- determining an occluded region of the visible image data; and
- identifying the region of interest as a portion of the thermal sensor data that corresponds to the occluded region of the visible image data.

14. One or more non-transitory computer-readable media storing instructions that, when executed, cause one or more processors to perform operations comprising:
- receiving sensor data from a thermal sensor associated with an autonomous vehicle;
- receiving map data or weather data associated with an environment proximate the autonomous vehicle;
- determining, based at least in part on the sensor data and at least one of the map data or the weather data, a parameter adjustment for the thermal sensor based on; and
- applying the parameter adjustment to the thermal sensor or data from the thermal sensor.

15. The one or more non-transitory computer-readable media as recited in claim 14, wherein the weather data indicates a temperature associated with the environment and the parameter adjustment is based at least in part on the temperature.

16. The one or more non-transitory computer-readable media as recited in claim 14, wherein the weather data indicates an environmental condition and the parameter adjustment is based at least in part on the environmental condition.

17. The one or more non-transitory computer-readable media as recited in claim 14, further comprising determining a pose of the autonomous vehicle and wherein the parameter adjustment is based at least in part on the pose.

18. The one or more non-transitory computer-readable media as recited in claim 14, further comprising:
- determining, based at least in part on the map data, a region of interest associated with the thermal sensor data;
- generating, based at least in part on the region of interest, a histogram associated with pixel values of the thermal sensor data; and
- wherein the parameter adjustment is based on the histogram.

19. The one or more non-transitory computer-readable media as recited in claim 18, wherein determining the region of interest associated with the sensor data further comprises determining a region associated with an empty region, and excluding the region from the region of interest.

20. The one or more non-transitory computer-readable media as recited in claim 18, further comprising:
- receiving visible image data from an image sensor associated with the autonomous vehicle; and
- wherein determining the region of interest associated with the sensor data further comprises:
  - determining an occluded region of the visible image data; and
  - identifying the region of interest as a portion of the thermal sensor data that corresponds to the occluded region of the visible image data.

\* \* \* \* \*